United States Patent
Burns

(10) Patent No.: US 8,560,941 B2
(45) Date of Patent: Oct. 15, 2013

(54) SCHEMA BASED USER INTERFACE MECHANISMS

(75) Inventor: Steven P. Burns, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 883 days.

(21) Appl. No.: 12/420,078

(22) Filed: Apr. 8, 2009

(65) Prior Publication Data

US 2010/0262902 A1  Oct. 14, 2010

(51) Int. Cl.
- G06F 17/30  (2006.01)
- G06F 3/14  (2006.01)
- G06F 3/048  (2013.01)

(52) U.S. Cl.
USPC ........... 715/237; 715/234; 715/760; 715/762; 715/763; 715/764; 707/E17.005; 707/E17.014

(58) Field of Classification Search
USPC ................ 715/237, 760, 762, 764, 763; 707/E17.005, E17.014
See application file for complete search history.

(56) References Cited

U.S. PATENT DOCUMENTS

| | | | |
|---|---|---|---|
| 6,330,006 B1* | 12/2001 | Goodisman | 715/762 |
| 6,799,190 B1* | 9/2004 | Boothby | 1/1 |
| 6,950,831 B2* | 9/2005 | Haley | 1/1 |
| 7,096,224 B2* | 8/2006 | Murthy et al. | 707/763 |
| 7,370,280 B2* | 5/2008 | Ho et al. | 715/762 |
| 7,451,158 B1* | 11/2008 | Vogt et al. | 705/7.12 |
| 7,467,192 B1* | 12/2008 | Lemler et al. | 709/223 |
| 7,505,987 B2* | 3/2009 | Kramer et al. | 1/1 |
| 8,086,951 B2* | 12/2011 | Kopp et al. | 715/224 |
| 8,296,435 B2* | 10/2012 | O'Connell, Jr. | 709/226 |
| 2002/0129060 A1* | 9/2002 | Rollins et al. | 707/513 |
| 2002/0196281 A1* | 12/2002 | Audleman et al. | 345/762 |
| 2004/0046789 A1* | 3/2004 | Inanoria | 345/748 |
| 2004/0054569 A1* | 3/2004 | Pombo et al. | 705/7 |
| 2004/0098408 A1* | 5/2004 | Gensel | 707/104.1 |
| 2004/0225999 A1* | 11/2004 | Nuss | 717/114 |
| 2005/0065977 A1* | 3/2005 | Benson et al. | 707/104.1 |
| 2005/0081144 A1* | 4/2005 | Hailey et al. | 715/513 |
| 2005/0100211 A1* | 5/2005 | Gibson et al. | 382/162 |
| 2006/0010374 A1* | 1/2006 | Corrington et al. | 715/517 |
| 2006/0015847 A1* | 1/2006 | Carroll, Jr. | 717/109 |

(Continued)

OTHER PUBLICATIONS

Olof Barring, et al., Towards Automation of Computing Fabrics Using Tools from the Fabric Management Workpackage of the EU DataGrid Project, CHEP03, Mar. 24, 2008, 8 pages http:I/arxiv.org/ftplcs/papers/O30510305050.pdf.*

(Continued)

Primary Examiner — Stephen Hong
Assistant Examiner — Mario M Velez-Lopez
(74) Attorney, Agent, or Firm — Rau Patents, LLC

(57) ABSTRACT

A user interface may be generated from a schema and a rule template to create data usable by an application. The schema may define the broad constraints of the data acceptable to the application, and the rule template may include specialized knowledge or logic for selecting appropriate data values. An automated user interface generator may use default values or information in the rule template to generate a user interface. In one embodiment, a schema and rule template may be used to generate policies for managing computing devices in an enterprise environment. The rule template may include rules that reflect expert knowledge or recommendations for selecting settings, and may include complex rules that incorporate attributes or values from several different configurable parameters.

18 Claims, 5 Drawing Sheets

(56) References Cited

U.S. PATENT DOCUMENTS

| | | | |
|---|---|---|---|
| 2007/0061740 A1* | 3/2007 | Marini | 715/762 |
| 2007/0112827 A1* | 5/2007 | Dettinger et al. | 707/102 |
| 2008/0005182 A1* | 1/2008 | Gauthier et al. | 707/200 |
| 2008/0162502 A1* | 7/2008 | Klein et al. | 707/100 |
| 2008/0184201 A1* | 7/2008 | Burns et al. | 717/121 |
| 2009/0125254 A1* | 5/2009 | Kotter et al. | 702/57 |
| 2010/0077325 A1* | 3/2010 | Barnea et al. | 715/763 |
| 2010/0262902 A1* | 10/2010 | Burns | 715/234 |
| 2011/0055744 A1* | 3/2011 | Ryan et al. | 715/769 |
| 2011/0066931 A1* | 3/2011 | Kim et al. | 715/205 |

OTHER PUBLICATIONS

Olof Barring, et al., Towards Automation of Computing Fabrics Using Tools from the Fabric Management Workpackage of the EU DataGrid Project, CHEP03, Mar. 24, 2008, 8 pages retrieved from http://arxiv.org/ftp/cs/papers/0305/0305050.pdf.

* cited by examiner

SCHEMA BASED USER INTERFACE MECHANISMS

BACKGROUND

Schemas may be used to define types used in a computing environment. A schema typically defines the constraints on the structure and content of objects of that type, above and beyond the basic syntax of the language in which the type is defined. In many embodiments, a schema may be considered a high level of abstraction for a document or program to which the schema applies.

Types that conform to a schema are, by definition, acceptable and useable by a program that complies with the schema. Schemas may be defined in many different languages and protocols. In the case of schemas defined in XML, the process of checking to see if an XML document conforms to a schema is called validation, which is separate from XML's core concept of syntactic well-formedness. Typical XML documents are well-formed, but a document may be valid when an XML parser may check the document for conformance with the document's schema. Documents are considered valid if they conform to the schema with which they have been associated.

There are languages developed specifically to express XML schemas. The Document Type Definition (DTD) language, which is native to the XML specification, is a schema language that is of relatively limited capability, but that also has other uses in XML aside from the expression of schemas. Two other very popular, more expressive XML schema languages are XML Schema (W3C) and RELAX NG.

The mechanism for associating an XML document with a schema may vary according to the schema language. The association may be achieved via markup within the XML document itself, or via some external means.

SUMMARY

A user interface may be generated from a schema and a rule template to create data usable by an application. The schema may define the broad constraints of the data acceptable to the application, and the rule template may include specialized knowledge or logic for selecting appropriate data values. An automated user interface generator may use default values or information in the rule template to generate a user interface. The rule template may include rules that reflect expert knowledge or recommendations for selecting values, and may include complex rules that incorporate attributes or values from several different configurable parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
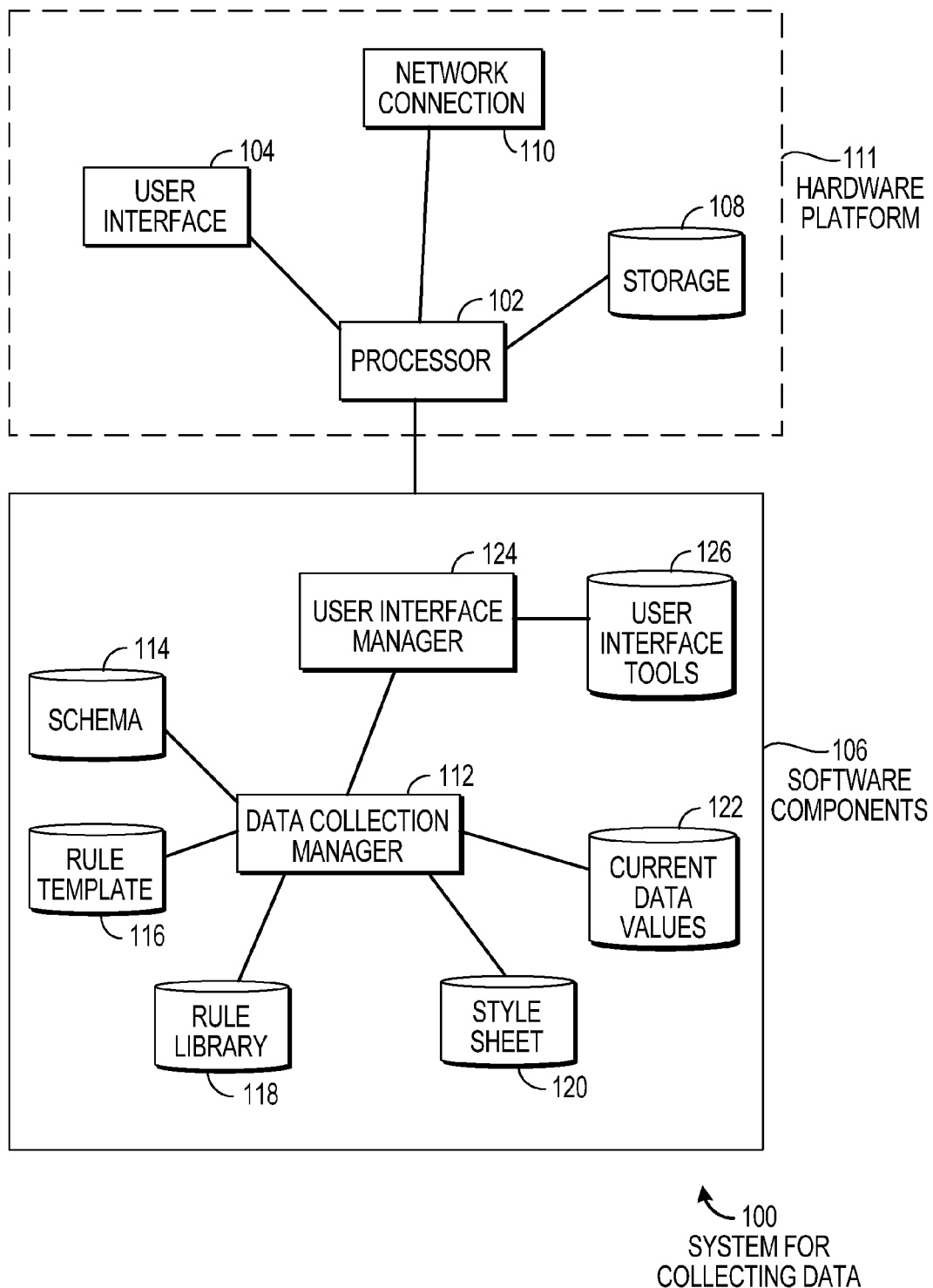
FIG. 1 is a diagram illustration of an embodiment showing a system for collecting data.

A system may generate a user interface from a schema and a rule template. A schema may define the broad constraints for data, while the rule template may include expert knowledge, best practices, or other limitations or suggestions for the data. The rule template may also include layout notation and user interface device definitions. An automated user interface generator may create and manage a user interface by laying out the user interface, creating user interface mechanisms, and binding data elements to user interface components.

The system may be used to generate data complying with a schema and further being guided by a rule template. The system may bind data elements to user interface components and collect data that complies with both the schema and rules, and may use various default mechanisms to select user interface tools or limits. In many embodiments, a rich user interface may be created with a very small description in a rule template.

The rule template may be a simple mechanism in which an expert in a field may define rules of thumb or express other knowledge. Rules may be defined that create limits for configurable parameters. In some cases, rules may contain arithmetic statements, inequalities, relationships, or other expressions that relate to one or more configurable parameters. In some cases, a rule may incorporate references to several configurable parameters as well as attributes that may describe the parameters. The attributes may be defined in the schema for the configurable parameters.

The system may work in conjunction with a user interface manager, which may be a framework for user interfaces. The framework may include controls for setting various features of a user interface, for laying out and formatting a user interface, as well as predefined user interface mechanisms. The user interface mechanisms may be buttons, drop down lists, sliders, spinners, text boxes, checkboxes, address bars, or any other tool.

In many cases, a user interface tool may represent a data object and may have limits or other conditions associated with the tool. For example, a slider may allow a user to adjust a value between an upper limit and a lower limit. The limits may be defined in a rule or, if the rule does not define the limit, the limit may be defined in the schema for the data object.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for collecting data. Embodiment 100 is an example of a system that may collect data from a user interface that is generated using a schema and a rule template.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a simplified example of hardware and software components that may be used to generate a user interface through which data may be collected. A data collection manager may use information from a schema, a rule template, and other sources to define a user interface in which bindings may be established between user interface elements and data objects. The rule template may contain rules that define suggested or mandatory values in certain situations, and may impose limits on the collected data.

Embodiment 100 may be an easy mechanism to gather data, especially where a designer may wish to add certain limitations or tailor the data gathering experience in certain ways. In many embodiments, the system for data gathering may have many tools and capabilities that may enable a designer to create a user interface to gather certain data with a minimum of work.

The system of embodiment 100 may operate on a hardware platform 111 that may consist of a processor 102 and a user interface device 104. Several software components 106 may operate on the processor 102 and cause information to be displayed and collected on the user interface device 104. The processor 102 may use various storage devices 108 which may be short term storage such as random access memory (RAM) or long term storage such as a hard disk or other storage media. In many cases, the hardware platform 111 may have a network connection 110.

The user interface device 104 may be any type of hardware that may present information and collect input. In a desktop computer embodiment, the user interface device 104 may consist of a display, keyboard, and a pointing device such as a mouse. Some devices may have a touchscreen interface that both displays and captures input. Any form of user interface may be used.

The user interface device 104 may be a graphical user interface. In many embodiments, the user interface device 104 may be contained in a graphical window or other type of user interface. In many embodiments, a user interface device 104 may be constructed as an interactive interface, with graphical output and a user input.

The user input may be received by any mechanism by which a user may interact with the user interface device 104. Examples of input mechanisms may include a mouse, tablet, touchscreen, stylus, trackball, keyboard, knob box, or any other input mechanism.

The hardware platform 111 may be any type of computing device that may have a user interface. A typical embodiment may be a personal computer or server computer that may or may not be located on a wired or wireless network. Other embodiments may be portable devices, such as cellular telephones, personal digital assistants, handheld scanners, or other devices. In some embodiments, the hardware platform 111 may comprise server devices operable over a network. In one such embodiment, a server computer may perform the operations of the processor 102 and communicate to another device where information is displayed and captured on a user interface device 104.

The software components 106 may simplify the process of creating a user interface for displaying and capturing data. A data collection manager 112 may gather information from several sources to present and collect data from the user interface device 104. The data may be defined in a schema 114, and the logic and construction of the user interface may be defined a rule template 116, which may reference objects in a rule library 118 and style sheet 120. A user interface manager 124 may be a framework that provides much of the user interface functionality, along with user interface tools 126.

A schema is a definition of the structure, content, and, to some extent, the semantics of a dataset. A schema may represent relationships between elements of the dataset, as well as describe the format and limits of data elements. Some schemas enable data to be expressed in many manners, including complex expressions that may use elements to define other elements or parameters associated with an element.

Many schema languages exist. For example, XML data may be described using Document Type Definition language. Other schema languages include XML Schema (W3C), REgular LAnguage for XML Next Generation (RELAX NG), and other schema languages exist. Schemas may exist for data structures other than XML as well.

In this specification, XML Schema (W3C) may be used as an example of various data structures that may be analyzed. However, such examples are merely illustrative and similar concepts may be found in other schema applications.

The schema 114 may define the data that may be presented and collected on the user interface device 104. In many embodiments, the data collected may be a subset of the data defined in a particular schema. In some cases, however, data from two or more schema may be combined into a single data collection operation.

The schema 114 may define a configurable parameter. A configurable parameter may be a data object that may be changed or modified, and the configurable parameter may be defined by a data type within the schema. In many cases, the data type may be defined with certain limitations.

In a simple example, a type may be defined for hour of the day. The type may be an integer with an upper bound of 24 and a lower bound of 0.

The rule template 116 may define which configurable parameters are to be processed by the data collection manager 112. The rule template may include rules that reference the configurable parameters. A rule may express suggestions, best practices, expert knowledge, or other limitations for a configurable parameter. In some cases, complex rules may be created that involve arithmetic calculations, conditional statements, comparisons, or other expressions that may involve two or more configurable parameters or their attributes.

The rules may be created to express expert knowledge or best practice suggestions for the values of configurable parameters.

In one use scenario, a system may create policies for managing client computer devices. Many of today's computing devices may have many hundreds of configuration points. A set of rules may be created in a rule template 116 that may define certain best practices for setting the configuration points. A rule may, for example, request a user to select a high, medium, or low security setting, and the rule may define values for certain configuration points that align with the particular setting selected by the user. Such a rule may set several configurable parameters with values as defined in the rule.

In some cases, the configurable parameters may be set with a static value defined in a rule. Using the example above, a rule may define a configurable parameter for a specific firewall port to be enabled.

In some cases, the configurable parameters may be defined using a formula or expression that references one or more configurable parameters or attributes. Continuing with the use scenario above, an example of a rule containing a conditional expression may set a firewall port enabled if a specific application is present on the device, otherwise the firewall port may be disabled. Another example may be defining a virtual disk size by summing storage space allocated to several selected applications and multiplying by a constant.

These examples may illustrate cases where a rule may reference several other configurable parameters. In the example of a virtual disk size, the virtual disk size may be a configurable parameter and other configurable parameters may be defined for each application that may be present on the device.

In many cases, a rule template may include information that may be used to define user interface elements. Many embodiments may include a user interface manager 124 that may have many user interface tools 126, and rules in the rule template 116 may call the user interface tools 126 as well as specify different features of a user interface.

Each embodiment may have different capabilities, features, and mechanisms for generating a user interface. In one example, a user interface manager 124 may create HTML pages that may be viewable in a web browser with a plugin that may contain many powerful features and tools for displaying content. The plugin may contain simple and advanced user interface controls or tools.

A simple example of a user interface tool may be a slider user interface tool. The slider may be dragged from one side to another to select from a range of values. The slider example may be discussed later in this specification in more detail.

In some embodiments, style sheets 120 may be used to provide a 'look and feel' of a user interface. The style sheets 120 may be similar to style sheets used for HTML or web pages. In some embodiments, the style sheets 120 may be Cascading Style Sheets (CSS) that uses a style sheet language commonly used in web pages as well as any kind of XML documents including SVG and XUL. In many embodiments, much of the presentation elements of a user interface may be defined in a style sheet, such as colors, fonts, and layout. In some cases, different style sheets may be applied for different user interface devices. In cases where multiple style sheets are available, a priority scheme may determine which style sheet rules may apply when more than one style sheet rule applies in a situation.

The data collection manager 112 may generate a user interface from the schema 114 and rule template 116. An example of an XML embodiment is illustrated in the discussion of embodiment 600 presented later in this specification.

In many embodiments, a rule template 116 may reference and incorporate other rule templates. In such an embodiment, a completely defined rule template may be included within another completely defined rule template. Such embodiments may allow a developer to create several small rule templates focused on individual items, then aggregate them together to create a larger rule template.

The data collection manager 112 may use a rule definition to select a user interface tool for a particular situation. In some cases, the rule definition may include a specific reference to a user interface tool, such as a slider tool, drop down menu, or some other tool.

In other cases, the rule definition may not specify a specific user interface tool. In such a case, the data collection manager 112 may determine an appropriate user interface tool by identifying a data type from the schema and selecting a matching user interface tool. Such embodiments may allow a rule to merely identify a data object to be created and allow the data collection manager 112 to select and configure a user interface tool.

The data collection manager 112 may create a data object and bind the data object to values that are displayed and collected in a user interface tool. In the example of a slider user interface tool, the value represented by the slider element may be bound to a data object. As a user changes the position of a slider, the value of the data object may be updated.

In many cases, a user interface tool may have limits associated with it. In the case of a slider that generates a numerical value, a user interface tool may have an upper and lower limit for that value. The data collection manager 112 may determine a limit for a user interface tool and for the corresponding data object by either limits defined in the rule template 116 or by limits defined in the schema 114. Typically, a limit defined in the rule template 116 may take precedence or override a limit defined in the schema 114.

Some embodiments may display a set of current data values 122 when a user interface is generated. The current data values 122 may be values that are read from a previously saved set of data objects created by the data collection manager 112 or by reading the data values from other sources. In some embodiments, the data gathered by the system of embodiment 100 may be stored in a database, configuration file, or may be stored in multiple data storage locations. In such embodiments, the current data values 122 may be gathered by reading current values from the various sources.

The current data values 122 may be used to populate data objects with values prior to allowing a user to interact with a user interface.

Figure 2:
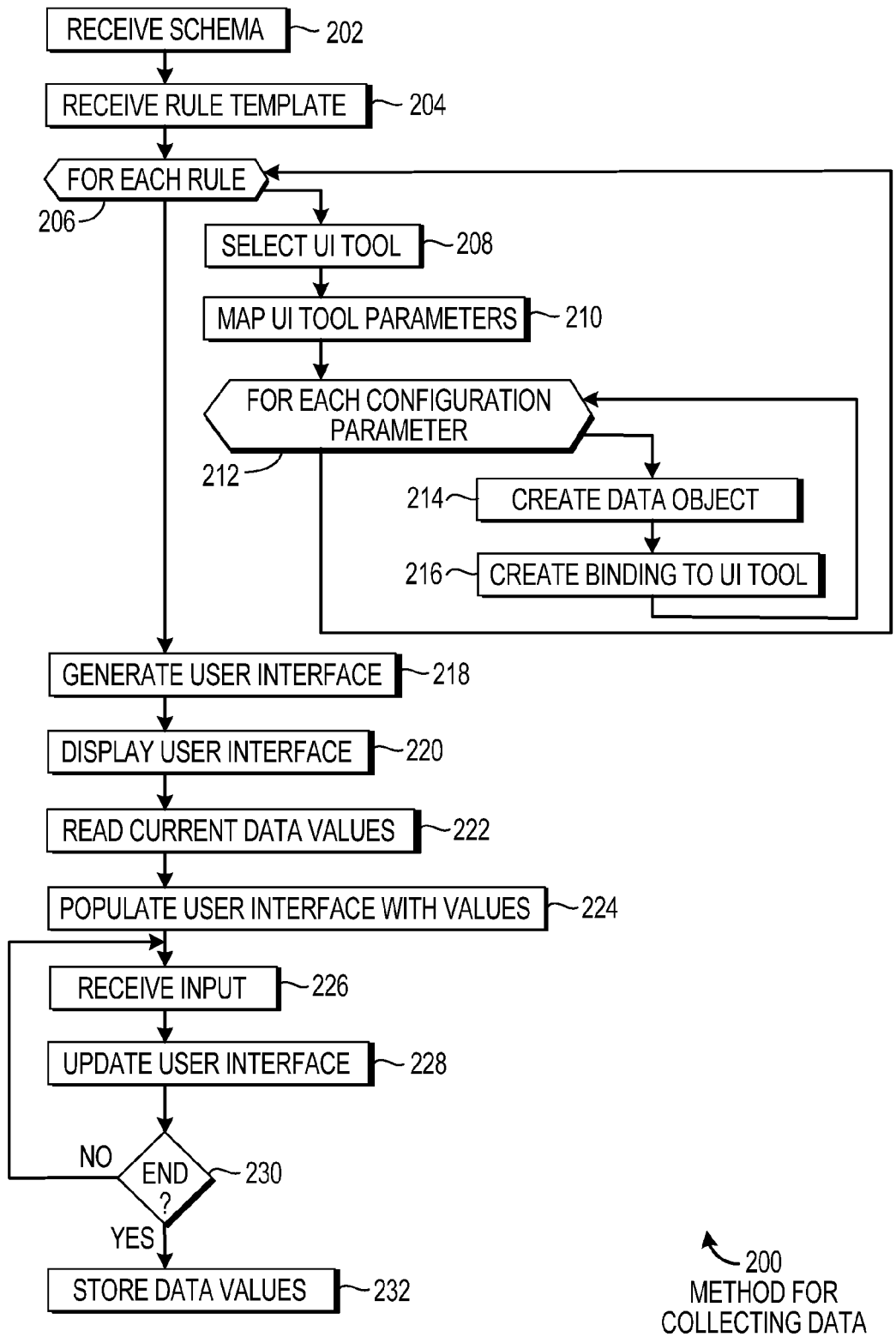
FIG. 2 is a flowchart illustration of an embodiment showing a method for collecting data.

FIG. 2 is a flowchart illustration of an embodiment 200 showing a method for collecting data. Embodiment 200 is a simplified example of a method that may be performed by a data collection manager, such as the data collection manager 112 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a method that may use schema and rule templates to create a user interface and collect data from the user interface. The rule templates may fully or partially describe a user interface tool and the bindings and limitations of a data object associated with the user interface tool. The bindings may be used to collect data from the user interface tool into a data object, then the data objects may be stored and subsequently used.

The embodiment 200 is an example of how a user interface may be constructed from a fully or partially defined rule. When an element is defined in the rule, that element may be used. When the element is not defined in the rule, embodiment 200 may provide a mechanism to determine an appropriate element by examining the schema for configurable parameters associated with the rule.

In block 202, a schema may be received. In some embodiments, two or more schema may be used.

In block 204, a rule template may be received. In some embodiments, a rule template may include a referent to a schema. In such cases, a rule template may be read from a file or other source and the schema may then be read using a URL or other identifier for the schema. In the case of a URL, the URL may be traversed to read the schema from a local or remote location.

A rule template may include several rules, each of which may include one or more configuration parameters. The configuration parameters may be data objects that are to be populated by the method of embodiment 200.

Each rule may be processed in block 206.

A user interface tool may be selected for the rule in block 208. In some cases, the user interface tool may be defined in the rule. When the user interface tool is not defined in the rule, an appropriate user interface tool may be selected based on the schema of the configuration parameters. Embodiment 400 illustrates one example of a method for performing such an operation. Embodiment 400 is presented later in this specification.

Each user interface tool may have several associated parameters. The user interface tool may have a data source that may be bound to a data object. The data source, in some embodiments, may display and supply data that is bound to the data object.

A user interface tool may have other parameters, such as limits or options that may be defined in the rule. When the parameters are not defined in the rule, the parameters may be defined by examining the schema or by using default values. Embodiment 300 illustrates an example of a method for mapping the limits of a user interface.

For each configuration parameter in block 212, a data object may be created in block 214 and a binding may be created in block 216 between the user interface tool and the data object. The data object may be a location in memory that may store a value that is displayed by the user interface tool and can be updated through the binding.

After each rule is processed in block 206, the user interface may be generated in block 218.

The term "user interface" in this context relates to the graphical image or other elements that may be displayed on user interface hardware. In many embodiments, a graphical user interface (GUI) may be generated.

The process of generating a user interface may involve operations of a user interface manager, such as the user interface manager 124 described in embodiment 100. The user interface may be generated by setting up each user interface tool with any options or parameters, and then arranging the user interface tools in a layout and applying any styles or formatting.

The user interface may be defined in any suitable manner. In some embodiments, a user interface may be defined in HTML and may be displayed using a web browser application. Other embodiments may use other application windows or other mechanisms to display the user interface tools and collect data.

In block 222, current data values may be read and, in block 224, the user interface may be populated with the values. In some embodiments, a set of existing or current values may be read from some type of data source, such as a configuration file, database, or some other source. In some cases, the data collected from a previous operation of embodiment 200 may be stored in a file or database. The stored values may be read into memory and the data objects populated by the stored values. By populating the data objects, the binding may cause the stored values to be presented on the user interface.

In block 226, input may be received from a user and the user interface may be updated in block 228. The process of blocks 226 and 228 may be looped through many times in block 230 until an end command or store command is activated and the data are stored in block 232.

In many embodiments, the bindings between the data objects and the user interface tools may automatically perform the updating process of blocks 226 and 228 when the user interacts with the user interface tools.

The data may be stored in block 232 using any type of data storage mechanism appropriate for the situation.

The method of embodiment 200 may be used to collect data for any application or for any follow on use. The method of embodiment 200 allows data to be collected that conform to the overall schema as well as rules that may be defined that further constrain the data values. The rules may serve as a second layer of constraints on top of the schema definition and may be used to express expert knowledge or other restrictions on the data.

Figure 3:
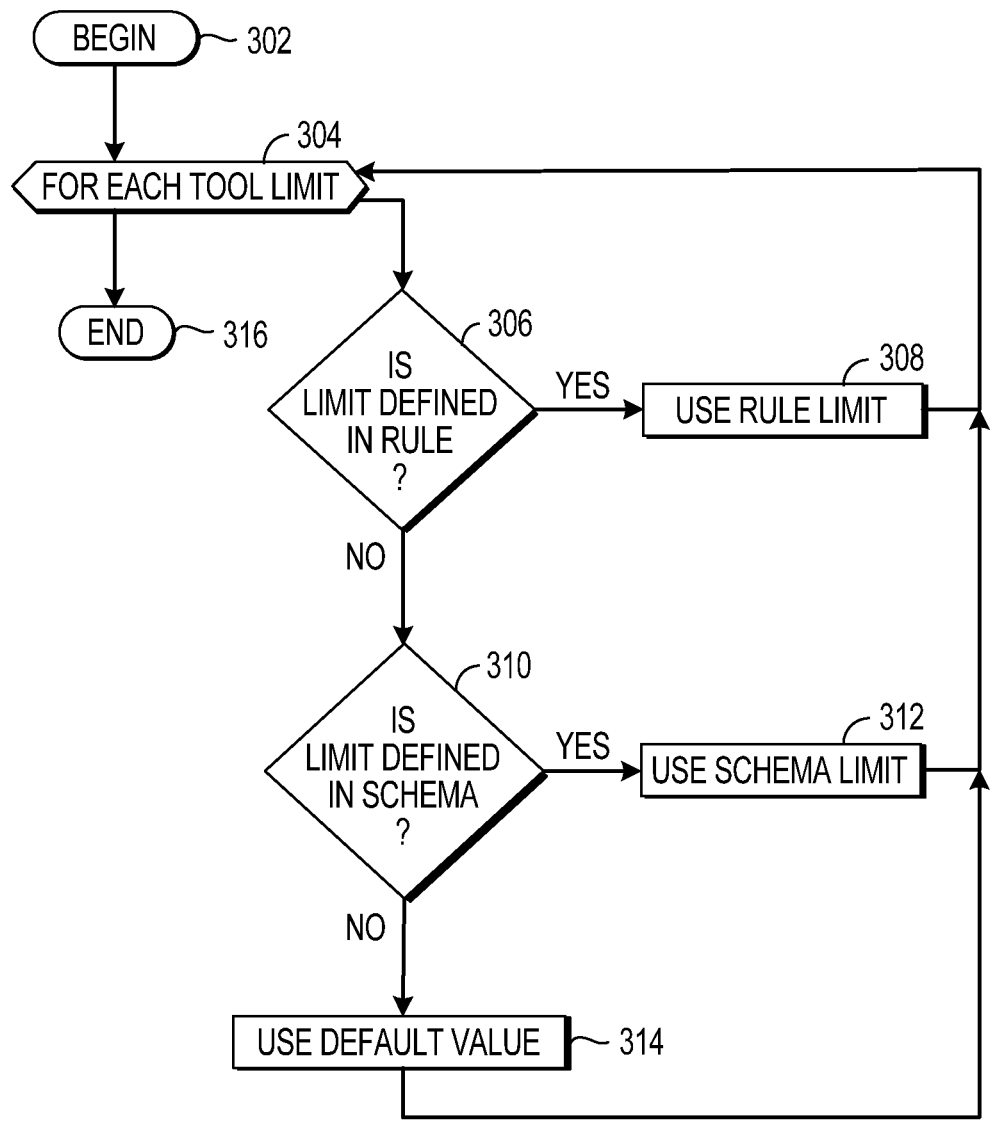
FIG. 3 is a flowchart illustration of an embodiment showing a method for mapping user interface tool parameters.

FIG. 3 is a flowchart illustration of an embodiment 300 showing a method for mapping user interface tool parameters. Embodiment 300 is a simplified example of a method that may be performed for block 210 in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may be used to define limits or other parameters that may be expressly or impliedly defined in a rule.

Many user interface tools may have limits or other parameters. In the example of a slider user interface tool, the limits may be an upper and lower bound for the data values. The upper and lower bounds may constrain the slider tool so that a user may only be able to select a value within the bounds.

In many cases, a rule may identify a user interface tool, such as a slider mechanism, and may or may not define the limits for the user interface tool. The method of embodiment 300 may be performed for each user interface tool identified in block 206 of embodiment 200.

The process may begin in block 302. Each tool limit or parameter may be processed in block 304.

For each user interface tool limit in block 304, if the limit is defined in the rule in block 306, the limit may be used in block 308 and the process may return to block 304 to process another limit.

If the limit is not defined in the rule in block 306, but the limit is defined in the schema in block 310, the schema limit may be applied in block 312, and the process may return to block 304 to process another limit.

If the limit is not defined in the rule in block 306 and not defined in the schema in block 310, a default value may be used in block 314. The default value may be a standard default value defined in a rule or defined in the user interface tool definition.

After processing each user interface tool limit in block 304, the method of embodiment 300 may end in block 316.

Taking the example of a slider user interface tool, an upper limit for the slider may be defined in a rule, in which case the rule-defined limit may be used for the upper limit. The lower limit, however, may not be defined in the rule and may be defined in the schema. In such a case, the schema limit may be applied.

Figure 4:
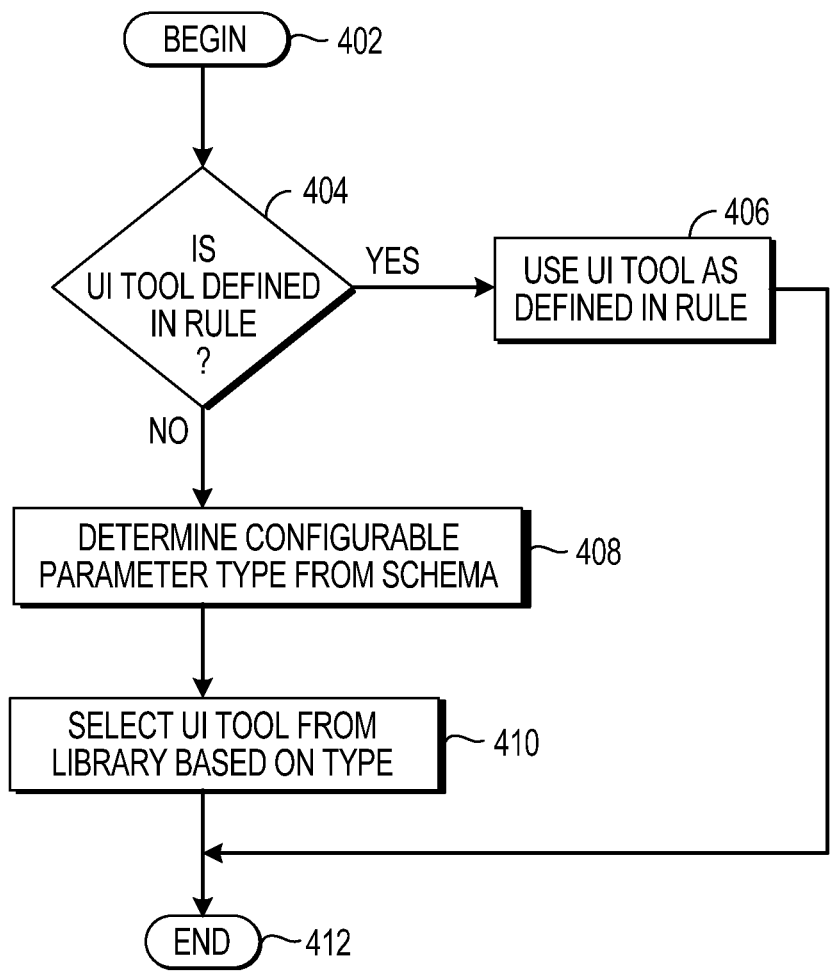
FIG. 4 is a flowchart illustration of an embodiment showing a method for selecting a user interface tool

FIG. 4 is a flowchart illustration of an embodiment 400 showing a method for selecting a user interface tool. Embodiment 400 is a simplified example of a method that may be performed for block 208 in embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may be used to select a user interface tool whether or not a specific user interface tool has been identified in a rule. If the user interface tool has been identified in the rule, the matching user interface tool may be used. If not, the user interface tool may be selected based on the schema.

The process may begin in block 404.

If the user interface tool is identified in the rule in block 404, the identified user interface tool may be used in block 406.

If the user interface tool is not identified in the rule in block 404, the schema may be examined in block 408 to determine a general type for the data object. Based on the type, a user interface tool may be selected in block 410 from a library of user interface tools.

After selecting a user interface tool, the process may end in block 412.

In the example of a data type that is a numerical value with upper and lower limits, a user interface tool may be selected that has parameters for upper and lower bounds. An example of such a user interface tool may be a slider mechanism as described above in several examples.

Figure 5:
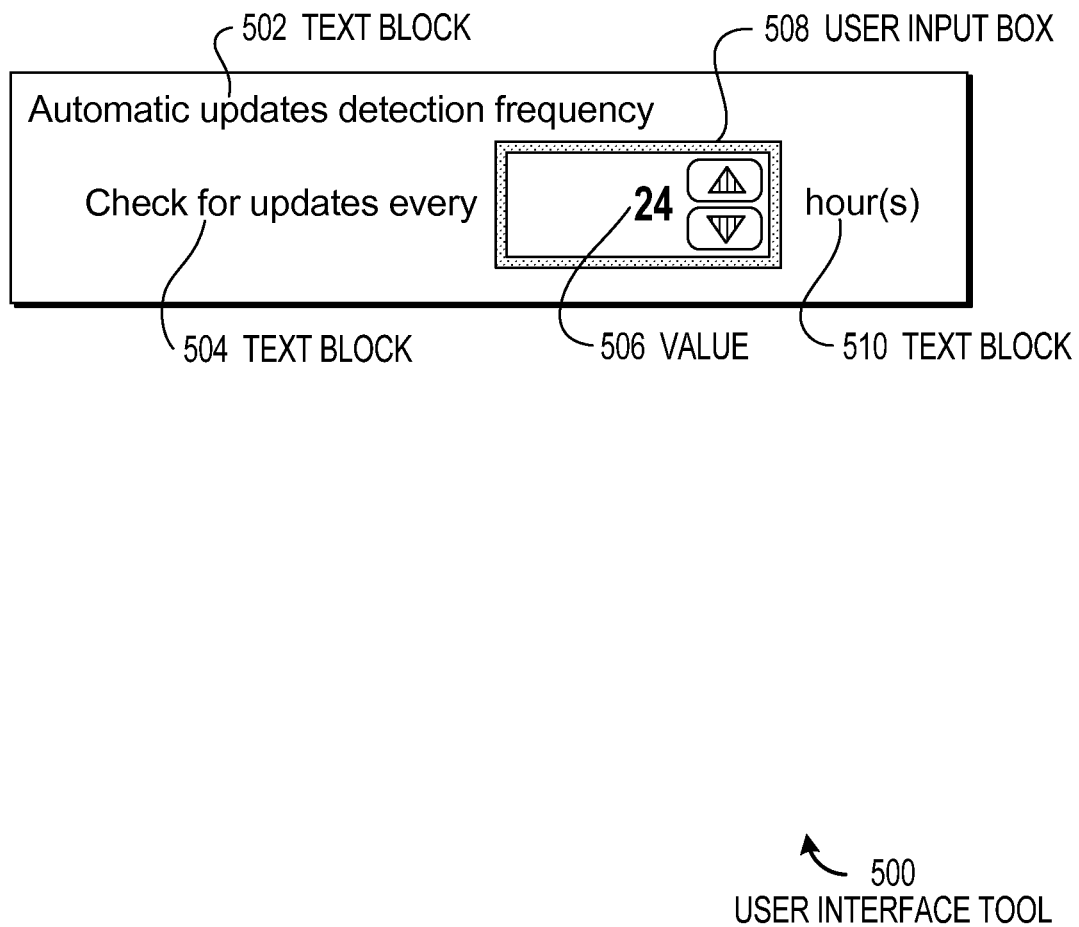
FIG. 5 is a diagram illustration of an embodiment showing a user interface tool.

FIG. 5 is a diagram illustration of an embodiment 500 showing a user interface tool that may be defined by a rule. Embodiment 500 is a simplified example of a user interface tool as defined by an XML rule description.

Embodiment 500 and the code snippets described below represent a simple example of a rule description and the associated user interface tool that may be generated using the code. Embodiment 500 is merely one manner of implementing a rule and the syntax, expressions, or other features of the code snippets presented are merely a simplified example and are not intended to directly apply to any specific embodiment.

Embodiment 500 illustrates a user interface tool that is created by the snippet of code in Table 1. Embodiment 500 shows a user interface tool that has text blocks 502, 504, and 510, as well as a user input box 508 with a current value 506.

TABLE 1

```
<pol:PolicyTemplate
    xmlns="http://schemas.microsoft.com/client/2007"
    xmlns:x="http://schemas.microsoft.com/winfx/2006/xaml"
    xmlns:pol="clr-namespace:System.Management.Policy;assembly=System.Management.Policy"
    xmlns:sys="clr-namespace:System;assembly=mscorlib">
    <pol:PolicyTemplate.Resources>
        <!-- The table of BindingSources. -->
        <pol:BindingSources x:Key="TemplateBindingSources">
            <sys:String>DetectionFrequency</sys:String>
        </pol:BindingSources>
        <pol:ConfigPointBindingSource x:Key="DetectionFrequency" InitialValue="24"
ConfigurationPointId="http://schemas.microsoft.com/policy/windows/update/agentsettings/
CPID_UpdateCheckFrequency" />
    </pol:PolicyTemplate.Resources>
    <!-- The UI controls for the form. -->
```

TABLE 1-continued

```
<StackPanel>
    <TextBlock Text="Automatic updates detection frequency"/>
    <StackPanel Orientation="Horizontal" Margin="20,5,0,0">
        <TextBlock Text="Check for updates every" VerticalAlignment="Center"/>
        <NumericUpDown
            Value="{Binding Source={StaticResource DetectionFrequency},
Path=DataItem.Value, Mode=TwoWay}"
            Minimum="{Binding Source={StaticResource DetectionFrequency},
Path=DataItem.Type.MinInclusive}"
            Maximum="{Binding Source={StaticResource DetectionFrequency},
Path=DataItem.Type.MaxInclusive}"
            Style="{StaticResource NormalNumericUpDownStyle}"
            MinWidth="75" VerticalAlignment="Center" Margin="5,0,5,0"/>
        <TextBlock Text="hour(s)" VerticalAlignment="Center"/>
    </StackPanel>
</StackPanel>
<!-- A RuleTemplate that produces a rule using BindingSources as inputs. -->
<pol:RuleTemplate x:Name="DetectionFrequencyRule" Invariant="$var1 == $var2"
IsEnabled="True">
    <pol:RuleTemplate.Variables>
        <pol:RuleVariable Name="$var1"
            Source="{Binding Source={StaticResource
DetectionFrequency},Path=DataItem.Type.Id}"/>
        <pol:RuleVariable Name="$var2"
            Source="{Binding Source={StaticResource
DetectionFrequency},Path=DataItem.Value}"/>
    </pol:RuleTemplate.Variables>
</pol:RuleTemplate>
</pol:PolicyTemplate>
```

Table 1 is a code snippet for a rule template. Table 1 is written in XML.

The first block prior to the Table of Binding Sources is a reference to schemas that may be used by an XML validator. In this embodiment, the rule template may use a URL to define the schema. The ConfigurationPointId identifies the schema used by the rule template. When the rule template is evaluated by a data collection manager 112, the schema may be located by traversing the URL and loading the schema.

The block beginning with the commented line "Table of Binding Sources" identifies the configurable parameter CPID_UpdateCheckFrequency by the source DetectionFrequency with an initial value "24".

The block beginning with the comment "The UI Controls for the Form" describes the user interface tool that is used for this rule. Each StackPanel object may describe a block within the user interface. In the first StackPanel, a TextBlock defines the text "Automatic updates detection frequency", which is used as text block 502.

A second StackPanel is nested inside the first StackPanel with the horizontal orientation and margin parameters. The TextBlock "Check for updates every" is text block 504 in the figure.

A NumericUpDown object is the user interface tool definition, and corresponds with the user input box 508. Within the NumericUpDown object, the binding sources are set to DetectionFrequency as defined above, and has a maximum and minimum value defined.

In this embodiment, a user interface tool is defined in the rule template as opposed to calling a user interface tool from a library.

The block beginning with the comment "Rule Template" begins a rule definition. The rule is given a name "DetectionFrequencyRule" and defines the variables $var1 and $var2 to the binding sources used in the user interface tool definition.

The resulting user interface tool is shown as embodiment 500.

The example of embodiment 500 and Table 1 is merely one simple example of how a user interface tool and a rule may be defined using XML. Other embodiments may use different syntax, different structures, or different mechanisms for defining rules and user interface tools.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method being performed on a computer processor, said method comprising:
  receiving a schema comprising a first configurable parameter and a first attribute for said first configurable parameter;
  receiving a rule template comprising a rule for said configurable parameter, said rule comprising a limit for said configurable parameter;
  selecting a user interface tool based on said rule template, said user interface tool having a first limiting value;
  creating a data object for said first configurable parameter;
  causing said user interface tool to be displayed on a user interface;
  binding said data object to said user interface tool;
  receiving a data value from said user interface;
  storing said data value in said data object;
  identifying a rule type based on a second configurable parameter defined in said schema;
  selecting a predefined generic rule based on said rule type from a rule library, said rule library comprising a plurality of generic rules, said plurality of generic rules comprising a references to a second user interface tool;

creating a second data object for said second configurable parameter;

binding said second data object to said second user interface tool; and displaying said second user interface tool.

2. The method of claim 1, said first limiting value being defined in said rule.

3. The method of claim 1 further comprising:

searching for a reference to said first limiting value in said rule;

not finding said reference in said rule; and using said first attribute as said first limiting value.

4. The method of claim 1:

said schema comprising a second configurable parameter and a second attribute for said second configurable parameter;

said rule comprising a reference to said first attribute and a reference to said second attribute.

5. The method of claim 4, said rule comprising an arithmetic expression comprising said first attribute and said second attribute.

6. The method of claim 4, said rule comprising a conditional statement comprising said first attribute and said second attribute.

7. The method of claim 1, said rule template comprising a nested rule template.

8. The method of claim 1 further comprising applying a style sheet to said user interface.

9. A system comprising:

a user interface device;

a library of user interface tools;

a user interface manager configured to use said library of user interface tools to create a user interface on said user interface device;

a computer processor configured to perform a method comprising:

receiving a schema comprising a first configurable parameter and a first attribute for said first configurable parameter;

receiving a first rule template comprising a first rule comprising a reference to said first configurable parameter, said first rule comprising a limit for said configurable parameter and a first user interface configuration feature setting;

selecting a first user interface tool from said library, said first user interface tool comprising a data input mechanism and being configurable using said first user interface configuration feature setting;

creating a binding between a data object and said data input mechanism;

causing said user interface manager to display said first user interface tool according to said first user interface configuration feature setting;

receiving a data value from said data input mechanism; and identify a rule type based on a second configurable parameter defined in said schema;

select a predefined generic rule from a set of predefined generic rules based on said rule type; and use said selected predefined generic rule for said second configurable parameter to create a second binding and causing said user interface manager to display said second user interface tool.

10. The system of claim 9 further comprising:

a rule library comprising the set of predefined generic rules, said set of predefined generic rules comprising a reference to a second user interface tool.

11. The system of claim 9, said rule template comprising markup information defining at least one visual aspect of said user interface.

12. The system of claim 9, said rule template comprising a reference to a style sheet, said style sheet being used by said user interface manager to change a visual aspect of said user interface device.

13. The system of claim 9, said rule template comprising a reference to a second rule template.

14. The system of claim 13, said second rule template comprising a set of user interface tools being displayed within a user interface defined by said first rule template.

15. A method being performed on a computer processor, said method comprising:

receiving a schema comprising a first configurable parameter and a first attribute for said first configurable parameter, said first attribute comprising a first limit for said configurable parameter and comprising a second configurable parameter and a second attribute for said second configurable parameter, said second attribute forming a third limit;

receiving a rule template comprising a rule for said configurable parameter, said rule comprising a second limit for said configurable parameter and a reference to a user interface tool;

creating a data object for said first configurable parameter;

causing said user interface tool to be displayed on a user interface, said user interface tool being displayed using said second limit and said third limit;

binding said data object to a first element of said user interface tool;

receiving a data value from said user interface; and storing said data value in said data object.

16. The method of claim 15 said second limit being different from said first limit.

17. The method of claim 15, said schema being defined using XML.

18. The method of claim 17, said rule template being defined in XML.

* * * * *